C. D. MULERTZ.
NON-SKID TIRE ATTACHMENT
APPLICATION FILED MAY 12, 1920.

1,389,777.

Patented Sept. 6, 1921.
2 SHEETS—SHEET 1.

Inventor.
C. D. Mulertz.

by
Lacey & Lacey,
Attorneys.

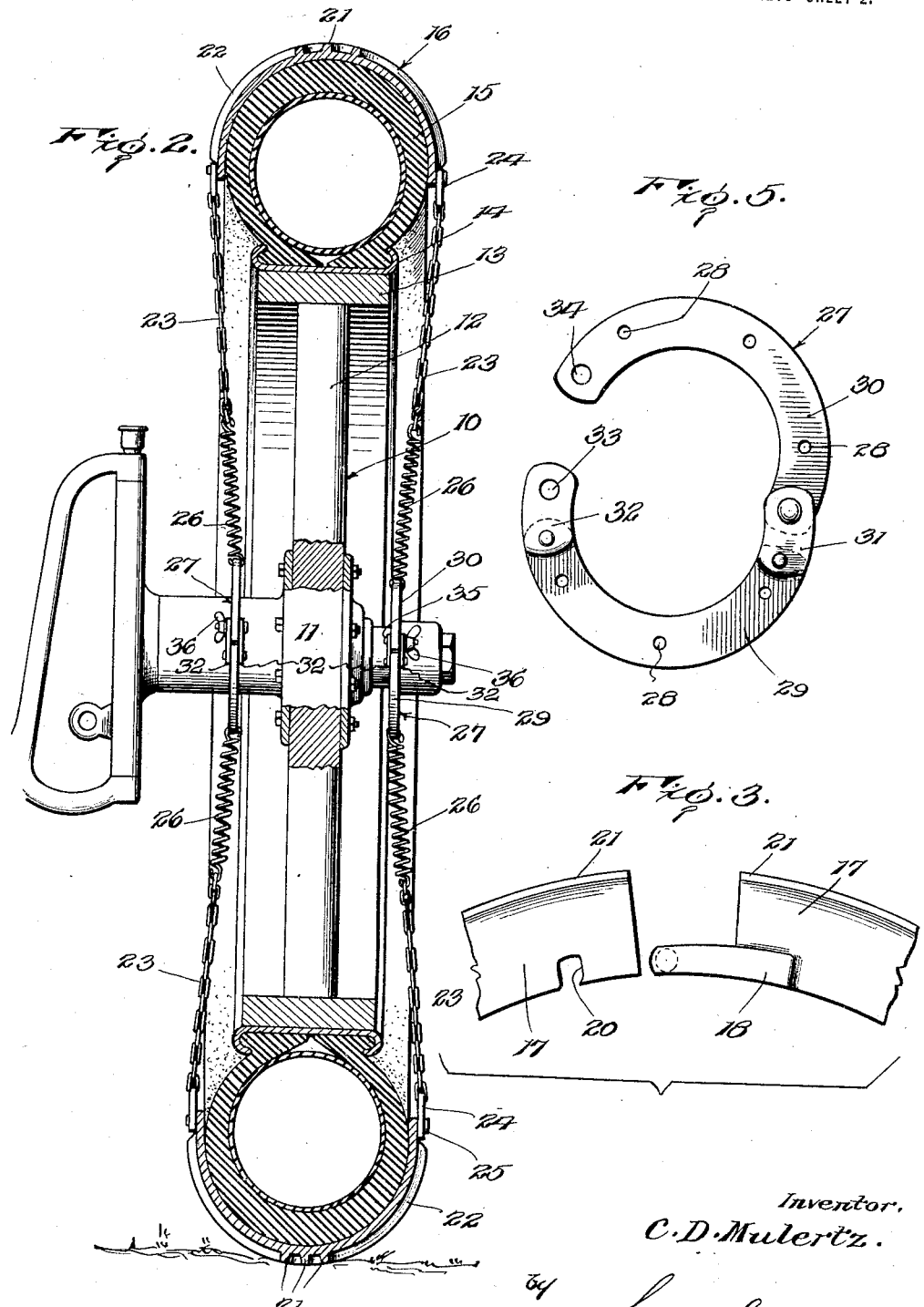

UNITED STATES PATENT OFFICE.

CATHARINE D. MULERTZ, OF SAN FRANCISCO, CALIFORNIA, ASSIGNOR OF ONE-HALF TO LOYD R. TAYLOR, OF MODESTO, CALIFORNIA.

NON-SKID TIRE ATTACHMENT.

1,389,777. Specification of Letters Patent. Patented Sept. 6, 1921.

Application filed May 12, 1920. Serial No. 380,849.

*To all whom it may concern:*

Be it known that I, CATHARINE D. MULERTZ, a citizen of the United States, residing at San Francisco, in the county of San Francisco and State of California, have invented certain new and useful Improvements in Non-Skid Tire Attachments, of which the following is a specification.

This invention relates to improvements in non-skid attachments for tires.

An important object of this invention is to provide a tire attachment for vehicle wheels which may be readily applied to a vehicle wheel with a minimum of inconvenience and effort on the part of the operator.

A further object of this invention is to provide a non-skid attachment for vehicle wheels including a plurality of segmental tread sections and novel means for detachably securing the sections about the tire.

A further object of the invention is to provide a device of the class described which in addition to serving as an anti-skid device will act as an external armor for the tire and thereby prevent the tire from becoming punctured or unduly worn.

A further object of the invention is to provide a device of the class described which is simple, desirable in use and cheap to manufacture.

Other objects and advantages of the invention will be apparent during the course of the following description.

Figure 1:
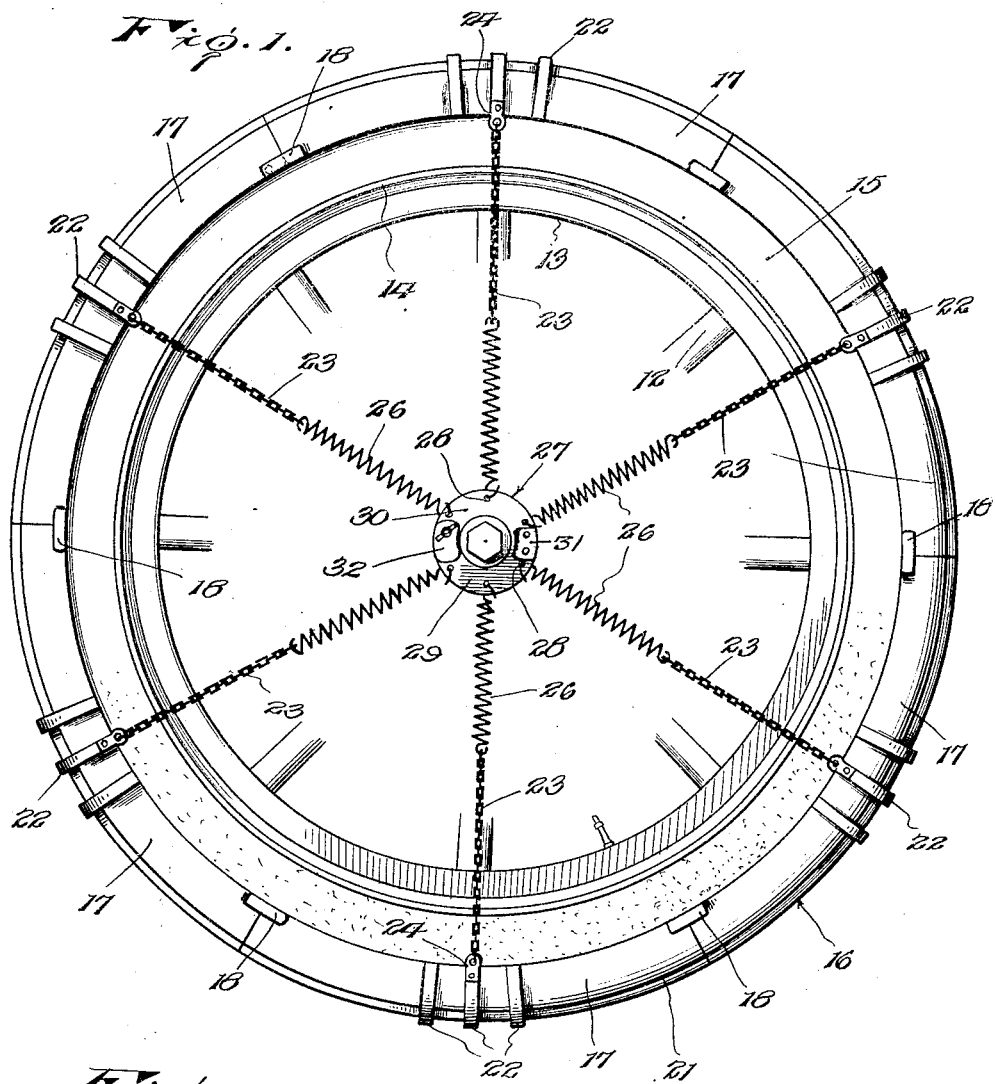
Figure 4:
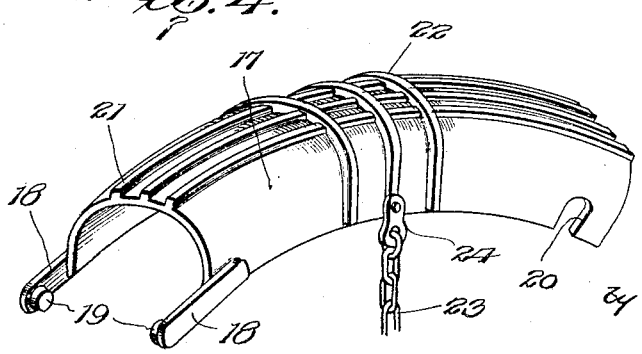

In the accompanying drawings forming a part of this application and in which like numerals are employed to designate like parts through the same:

Figure 1 is a side elevation of a vehicle wheel having the improved non-skid attachment applied, Fig. 2 is a central vertical transverse section through the wheel having the improved non-skid attachment applied, Fig. 3 is a fragmentary side elevation of the device illustrating the means for detachably connecting the segmental sections, Fig. 4 is a perspective of one of the segmental sections, Fig. 5 is a side elevation of a split collar forming a part of the invention.

In the drawings wherein for the purpose of illustration is shown a preferred embodiment of the invention, the numeral 10 generally designates a vehicle wheel having a hub 11, spokes 12 and the usual felly 13. A rim 14 is arranged about the felly and serves to secure a tire casing 15 to the wheel. Though the rim 14 is shown in the drawings as being of the clincher type it is obvious that a rim of any desired type may be used, as the specific construction of the wheel or rim forms no part of this invention.

The improved non-skid device herein illustrated comprises a circumferential tire engaging body 16 formed from a plurality of segmental sections 17 which may be formed from any desired metal, though it is preferable to employ brass or other non-rusting metal.

As illustrated in Figs. 1, 3 and 4, each segmental section 17 is provided at one end with a pair of longitudinally extending arms 18 having inwardly extending lugs 19 adapted to be received within transverse slots 20 formed in one end of the adjacent segmental section. The arms 18 are formed on the outer sides of the arcuate sections 17 so as to provide a smooth inner surface for the annular body 16. The arms 18 extend beyond the segmental section 17 to which they are attached and overlap the adjacent segmental section so that the inwardly extending lugs 19 of the same will be snugly received within the slots 20. Each segmental section is provided on its outer side with a plurality of spaced ribs 21 which when the segmental sections are secured about the tire form a plurality of continuous annular ribs. These ribs are preferably formed integral with the segmental sections and serve as an efficient means for preventing lateral skidding of the wheel.

As illustrated in Fig. 4, each segmental section is provided intermediate its ends with a plurality of spaced transversely extending ribs 22 each of which terminates at the edges of the sections and serves to prevent circumferential skidding of the wheel. The transverse ribs 22 also strengthen the segmental sections 17 which are formed integral with the ribs 21 so as to prevent the edge portions of the same from cracking or breaking. The transverse ribs 22 project above the longitudinal ribs 21, so as to provide an efficient gripping means during the rotation of the tire. As the sections 17 extend over the sides of the tire, the possibility of puncturing the tire as the result of passing over nails or the like is greatly lessened. The annular body 16 therefore serves as an external tire armor in addition to preventing circumferential and lateral skidding of the wheel. As the sections 17 have their ends flatly in contact a practically unbroken annular body is provided, so that objectionable material such as sand cannot lodge between the sections and the tire.

With reference to Figs. 1 and 2, it will be noted that a plurality of radial chains 23 are provided at their outer ends with ears 24 secured to the inner portions of the sections 17 by rivets 25 or other suitable fastening devices. The inner ends of the radially arranged chains 23 have connection with contractile coil springs 26 which serve to retain the annular body 16 about the tire. A pair of collars 27 are arranged on the hub at opposite sides of the spokes and are provided with openings or apertures 28 whereby the inner ends of the contractile coil springs 26 may be connected or anchored to the collar.

As illustrated in Fig. 5, each split collar includes semi-circular sections 29 and 30 connected by links 31 at one of their ends. One end of the semi-circular section 29 is provided with a second pair of links 32 as shown most clearly in Fig. 2 having openings 33 with which an opening 34 of the semi-circular section 30 is adapted to register for receiving a fastening element 35 in the form of a screw bolt and a wing nut 36. By this construction the collars 27 may be detachably secured on opposite sides of the wheel to the hub of the same for detachably securing the annular body 16 about the tire.

In the use of the device, the split collars 27 are secured about the hub of the wheel on opposite sides of the spokes and the annular body 16 is then arranged about the tire with the segmental sections 17 of the same connected. The coil springs are now positioned to yieldably secure the segmental sections 17 about the tire. However, as each segmental section 17 is locked to the adjacent sections, the possibility of the same becoming detached is remote.

During the rotation of the wheel having the improved non-skid attachment applied, the transverse ribs 22 serve to prevent any circumferential skidding of the wheel and the annular ribs 21 serve to prevent any lateral skidding of the wheel. As stated above, the annular body 16 extends about the sides of the tire and the tread of the same and therefore prevents the tire from being punctured while in use. The annular body 16 also serves to prevent the tire from being cut by ice and the like.

It is to be understood that the form of the invention herein shown and described is to be taken as a preferred embodiment of the same and that such minor changes in arrangement and construction of parts may be made as will remain within the spirit of the invention and the scope of what is claimed.

Having thus described the invention, what is claimed as new is:

In a device of the class described, the combination of a pair of split collars adapted to encircle a wheel hub, links pivoted to the members of the respective collars at one side of the hub, similar links connecting the members of the respective collars at the opposite sides of the hub, means to secure the last-mentioned links to hold the collars in closed position, coil springs connected at their inner ends to said split collars and extending radially from the same, flexible elements connected to the outer ends of said coil springs, and an annular ground-engaging body secured to the outer ends of said flexible elements.

In testimony whereof I affix my signature.

CATHARINE D. MULERTZ. [L. S.]